United States Patent
Bartlett

(10) Patent No.: US 10,117,213 B2
(45) Date of Patent: *Oct. 30, 2018

(54) MULTIPLE CARRIER ATTACHMENT ESTABLISHMENT AND MAINTENANCE

(71) Applicant: Google LLC, Mountain View, CA (US)

(72) Inventor: Scott Bartlett, Oakland, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/790,760

(22) Filed: Oct. 23, 2017

(65) Prior Publication Data

US 2018/0049148 A1 Feb. 15, 2018

Related U.S. Application Data

(63) Continuation of application No. 14/450,031, filed on Aug. 1, 2014, now Pat. No. 9,814,009.

(51) Int. Cl.
*H04W 4/00* (2018.01)
*H04W 60/00* (2009.01)
(Continued)

(52) U.S. Cl.
CPC ..... *H04W 60/005* (2013.01); *H04W 36/0022* (2013.01); *H04W 36/0066* (2013.01);
(Continued)

(58) Field of Classification Search
CPC .......... H04W 60/005; H04W 36/0022; H04W 36/0066; H04W 76/022; H04W 76/025; H04W 88/06
See application file for complete search history.

(56) References Cited

U.S. PATENT DOCUMENTS

| 6,381,315 | B1 | 4/2002 | Nhaissi |
| 7,180,898 | B2 | 2/2007 | Yoshida et al. |

(Continued)

FOREIGN PATENT DOCUMENTS

| EP | 1885144 A2 | 2/2008 |
| EP | 220365 A1 | 6/2010 |

(Continued)

OTHER PUBLICATIONS

Ericsson: "RAN-ANDSF Interwor", 3GPP Draft; R2-133440—WLAN 3GPP Radio Interworking—ANDSF Interworking, 3rd Generation Partnership Project (3GPP), Mobile Competence Centre; vol. RAN WG2; Sep. 27, 2013.

(Continued)

*Primary Examiner* — Maharishi V Khirodhar
(74) *Attorney, Agent, or Firm* — Faegre Baker Daniels LLP

(57) ABSTRACT

Systems and methods are described herein that facilitate attaching a mobile station to a target wireless network through a physical connection between the mobile station and a supporting wireless network. Uplink and downlink channels between the mobile station and the target wireless network tunnel through the supporting wireless network. The systems and methods described herein thereby enable a mobile station with a single transceiver to become simultaneously attached to multiple wireless networks. The systems and methods described herein further support the handover of a mobile station from a generic access component of a mobile network to a radio access component and the handover of a mobile station from a radio access component of a mobile network to a generic access component of the mobile network thus facilitating rapid transitions from one mobile network air interface to another.

13 Claims, 7 Drawing Sheets

(51) Int. Cl.
| | |
|---|---|
| *H04W 36/00* | (2009.01) |
| *H04W 36/36* | (2009.01) |
| *H04W 88/06* | (2009.01) |
| *H04W 76/12* | (2018.01) |
| *H04W 76/15* | (2018.01) |
| *H04W 36/14* | (2009.01) |
| *H04W 60/04* | (2009.01) |

(52) U.S. Cl.
CPC ............ *H04W 36/36* (2013.01); *H04W 36/14* (2013.01); *H04W 60/04* (2013.01); *H04W 76/12* (2018.02); *H04W 76/15* (2018.02); *H04W 88/06* (2013.01)

(56) References Cited

U.S. PATENT DOCUMENTS

| | | | |
|---|---|---|---|
| 7,433,929 | B2 | 10/2008 | Guilford et al. |
| 7,809,360 | B2 | 10/2010 | Agrawal et al. |
| 8,385,216 | B1 | 2/2013 | Shetty et al. |
| 8,391,192 | B2 | 5/2013 | Prakash et al. |
| 8,484,568 | B2 | 7/2013 | Rados et al. |
| 8,590,023 | B2 | 11/2013 | Gupta et al. |
| 9,210,621 | B1 | 12/2015 | Bertz et al. |
| 9,814,009 | B2 * | 11/2017 | Bartlett ............... H04W 60/005 |
| 2002/0169716 | A1 | 11/2002 | Johnson et al. |
| 2004/0246920 | A1 | 12/2004 | Savolainen |
| 2007/0037550 | A1 | 2/2007 | Armstrong |
| 2007/0147317 | A1 | 6/2007 | Smith et al. |
| 2007/0217363 | A1 | 9/2007 | Ue et al. |
| 2008/0009279 | A1 | 1/2008 | Sakawa |
| 2008/0107051 | A1 | 5/2008 | Chen et al. |
| 2008/0254768 | A1 * | 10/2008 | Faccin .................. H04W 76/02 455/411 |
| 2009/0061862 | A1 | 3/2009 | Alberth, Jr. et al. |
| 2009/0135783 | A1 * | 5/2009 | Khalil ............... H04W 36/0011 370/331 |
| 2009/0298467 | A1 | 12/2009 | Zohar |
| 2010/0304737 | A1 | 12/2010 | Jain et al. |
| 2011/0096673 | A1 | 4/2011 | Stevenson et al. |
| 2011/0306318 | A1 | 12/2011 | Rodgers et al. |
| 2012/0014271 | A1 | 1/2012 | Damenti |
| 2012/0052914 | A1 | 3/2012 | Yaqub et al. |
| 2012/0094653 | A1 | 4/2012 | Okuda |
| 2012/0164979 | A1 | 6/2012 | Bachmann et al. |
| 2012/0195223 | A1 | 8/2012 | Raleight |
| 2013/0040693 | A1 | 2/2013 | Chen et al. |
| 2013/0148567 | A1 | 6/2013 | Efrati et al. |
| 2013/0155842 | A1 | 6/2013 | Moore et al. |
| 2013/0203438 | A1 | 8/2013 | Shin |
| 2013/0250783 | A1 | 9/2013 | Ericson et al. |
| 2013/0279470 | A1 | 10/2013 | Sen et al. |
| 2013/0282915 | A1 | 10/2013 | Patel et al. |
| 2015/0098393 | A1 | 4/2015 | Tofighbakhsh et al. |
| 2015/0127939 | A1 | 5/2015 | Mazandarany et al. |
| 2015/0141037 | A1 | 5/2015 | Saha et al. |
| 2015/0208309 | A1 * | 7/2015 | Taneja ............... H04W 36/0066 455/426.1 |
| 2015/0281198 | A1 | 10/2015 | Lee et al. |
| 2016/0037340 | A1 | 2/2016 | Rayment et al. |
| 2016/0261596 | A1 | 9/2016 | Khello et al. |

FOREIGN PATENT DOCUMENTS

| | | |
|---|---|---|
| EP | 2244501 A1 | 10/2010 |
| WO | 2002-041580 A1 | 5/2002 |
| WO | 2004-047476 A1 | 6/2004 |
| WO | 2006-005947 A1 | 1/2006 |
| WO | 2008-060464 A2 | 5/2008 |
| WO | 2011-162688 A1 | 12/2011 |
| WO | 2014-011094 A1 | 1/2014 |
| WO | 2015-158263 A2 | 10/2015 |

OTHER PUBLICATIONS

Ericsson et al.: "Analysis of WLAN-3GPP interworking solutions", 3GPP Draft; R2-131388—Analysis of WLAN 3GPP Interworking Solutions, 3rd Generation Partnership Project (3GPP), Mobile Competence Centre; vol. RAN WG2; Apr. 6, 2013.

Levy, Martyn; "Best Practice Authentication Methods for Wi-Fi Offload"; http://www.acurixnetworks.com/single-post/2013/05/20/BestPractice-Authentication-Methods-For-WiFi-Offload; May 20, 2013.

Bircher et al., "An Agent-Based Architecture for Service Discovery and Negotiation in Wireless Networks"; University of Bern, Wired/Wireless Internet Comms. (WWIC); Jan. 21, 2004.

Silverman, Dwight; "Thinking of changing cellphone carriers? Check this app first," http://blog.chron.com/techblog/2011/06/thinking-of-changing-cellphone-carriers-check-this-app-first/, Houston Chronicle Techblog, Jun. 15, 2011.

VoLGA Forum, "VoLGA Stage 2 V1.7.0; Voice over LTE via Generic Access," Jun. 14, 2010.

Qualcomm Europe et al., "Text Proposal for UE Measurements for Minimizing Drive Tests," 3GPP TSG-RAN WG2 Meeting #66, R2-093175, May 4-8, 2009.

Qualcomm Europe et al., "Framework for UE SON Reports," 3GPP TSG-RAN WG3 and SA WG5, S5-090017, Jan. 12-13, 2008.

CMCC, "Network Selection for WLAN/3GPP Radio Interworking," 3GPP TSG-RAN WG2 Meeting 81#bis, R2-130973, Apr. 15-19, 2013.

Nikravesh et al., "Mobile Network Performance from User Devices: A Longitudinal, Multidimensional Analysis," Passive and Active Measurement: 15th International Conference, PAM 2014, Mar. 10-11, 2014.

VoLGA stage 2, V1.7.0, Jun. 14, 2010, Voice over LTE via Generic Access; Stage 2 Specification, Phase 1.

European Patent Office; International Search Report and Written Opinion for PCT Application No. PCT/US2015/041076; dated Nov. 5, 2015.

"Generic Access Network"; Wikipedia, The Free Encyclopedia; Wikimedia Foundation, Inc.; Feb. 5, 2015.

VoLGA Forum; Wikipedia, The Free Encyclopedia; Wikimedia Foundation, Inc.; Jan. 6, 2015.

U.S. Patent and Trademark Office; Non-Final Rejection; U.S. Appl. No. 14/450,031; dated Feb. 24, 2016.

U.S. Patent and Trademark Office; Final Rejection; U.S. Appl. No. 14/450,031; dated Jul. 5, 2016.

* cited by examiner

MULTIPLE CARRIER ATTACHMENT ESTABLISHMENT AND MAINTENANCE

CROSS-REFERENCE TO RELATED APPLICATIONS

This application is a continuation of U.S. patent application Ser. No. 14/450,031 (now U.S. Pat. No. 9,814,009), filed Aug. 1, 2014, both having inventor Scott Bartlett, entitled "MULTIPLE CARRIER ATTACHMENT ESTABLISHMENT AND MAINTENANCE," commonly assigned to the assignee of the present application, which are hereby incorporated by reference.

BACKGROUND

Mobile wireless networks provide a medium for the exchange of information amongst large populations of mobile devices and various devices connected to the public switched telephone network (PSTN) and the Internet. Mobile networks, such as a wireless wide area network (WWAN), are most commonly implemented as an aggregation of a plurality of individual cells. Each cell provides infrastructure through which signals are transmitted to and from mobile transceiver devices located within a particular coverage area. When joined together, the network of cells provides coverage to a large geographic area.

As mobile transceiver devices move geographically farther away from a transceiver of a cell, they may exit the coverage area provided by that cell and enter the coverage area provided by a neighboring cell. During such movement, it is necessary to perform a cellular handover in which the mobile transceiver device ceases to use the communication infrastructure provided by one cell and begins to use the infrastructure provided by the neighboring cell.

Furthermore, in some areas where the communication infrastructure provided by a first mobile network is of poor quality or of deficient capability with respect to an alternative mobile network, a mobile transceiver device, i.e. a mobile station (MS) or user equipment (UE), can cease to use the communication infrastructure provided by the first mobile network and begin to use the infrastructure provided by the alternative mobile network.

SUMMARY

A method, executed by a mobile station (MS) attached to a supporting wireless wide area network (WWAN), is described herein for attaching to a target WWAN while maintaining the attachment to the supporting WWAN, the method comprising transmitting, via a physical uplink channel with a radio access network (RAN) of the supporting WWAN, an attach request message addressed to a network interface of a generic access network (GAN) of the target WWAN, and receiving, from the target WWAN via a physical downlink channel with the RAN of the supporting WWAN, an attach accept message.

A method, executed by a target wireless wide area network, for attaching a mobile station currently attached to a supporting wireless wide area network is described herein, the method including receiving, from the MS via a physical uplink channel between the MS and a transceiver of a supporting WWAN, an attach request message, and establishing a service uplink channel with the MS and a service downlink channel with the MS that both include a core network gateway of the supporting WWAN.

A method, executed by a supporting wireless wide area network (WWAN) to which a mobile station (MS) is attached, for supporting attachment of the MS to a target WWAN is described herein, the method comprising receiving, from the MS at a transceiver via a physical uplink channel between the transceiver and the MS, an attach request that is addressed to an access point of a generic access network (GAN) of the target WWAN, internally forwarding, from the transceiver to a gateway of a core network of the supporting WWAN, the attach request, transmitting, from the gateway to the access point of the GAN of the target WWAN, the attach request, and supporting a resource control connection between the MS and the target WWAN, wherein supporting a resource control connection between the MS and the target WWAN includes: receiving, from the target WWAN at the gateway of the core network, one or more network transmissions that are addressed to the MS, internally forwarding, from the gateway of the core network to the transceiver, the one or more network transmissions, transmitting, from the transceiver to the MS via the physical downlink channel, the one or more network transmissions, receiving, from the MS at the transceiver via the physical uplink channel, one or more MS transmissions that are addressed to the access point of the GAN of the target WWAN, internally forwarding, from the transceiver to the gateway of the core network, the one or more MS transmissions, and transmitting, from the gateway to the access point of the GAN of the target WWAN, the one or more MS transmissions.

A mobile station configured to connect to a generic access network (GAN) of a target WWAN via a radio access network (RAN) of a supporting WWAN is described herein, the mobile station comprising a processor configured to construct an attach request addressed to a network interface of the GAN of the target WWAN, a radio frequency (RF) transceiver configured to transmit the attach request to the RAN of the supporting network via a physical uplink channel with the RAN of the supporting network and receive an attach accept message from the target WWAN via a physical downlink channel with the RAN of the supporting network, the attach accept message including a packet data network (PDN) address, and a processor readable storage medium configured to store an association relationship between an identifier of a subscription with the target WWAN and the PDN address.

A system is described herein for attaching a mobile station (MS) that is attached to a supporting wireless wide area network (WWAN) to a target WWAN, the system comprising the MS, the MS including an MS transceiver configured to: transmit an attach request and resource control connection data to a supporting WWAN transceiver via a physical uplink channel between the MS and the supporting WWAN transceiver, and receive resource control connection data from the supporting WWAN transceiver via a physical downlink channel between the MS and the supporting WWAN transceiver; the supporting WWAN, including: the supporting WWAN transceiver, configured to: receive an attach request and resource control connection data from the MS via the physical downlink channel, forward the attach request and the resource control connection data to a supporting WWAN core network, and forward resource control connection data received from the supporting WWAN core network to the MS; the supporting WWAN core network, configured to: receive an attach request and resource control connection data from the supporting WWAN transceiver, forward the attach request and the resource control connection data through a supporting WWAN gateway to an access point of a target WWAN generic access network (GAN), receive resource control connection data from the target WWAN GAN through the supporting WWAN gateway, and forward the resource control connection data received from the WWAN GAN through the supporting WWAN gateway to the supporting WWAN transceiver; and the target WWAN, including: the target WWAN GAN, having a generic access network controller (GANC) configured to: receive the attach request through the supporting WWAN gateway, forward the attach request to a target WWAN core network, transmit resource control connection data to the MS through the supporting WWAN gateway, and receive resource control connection data from the MS through the supporting WWAN gateway.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
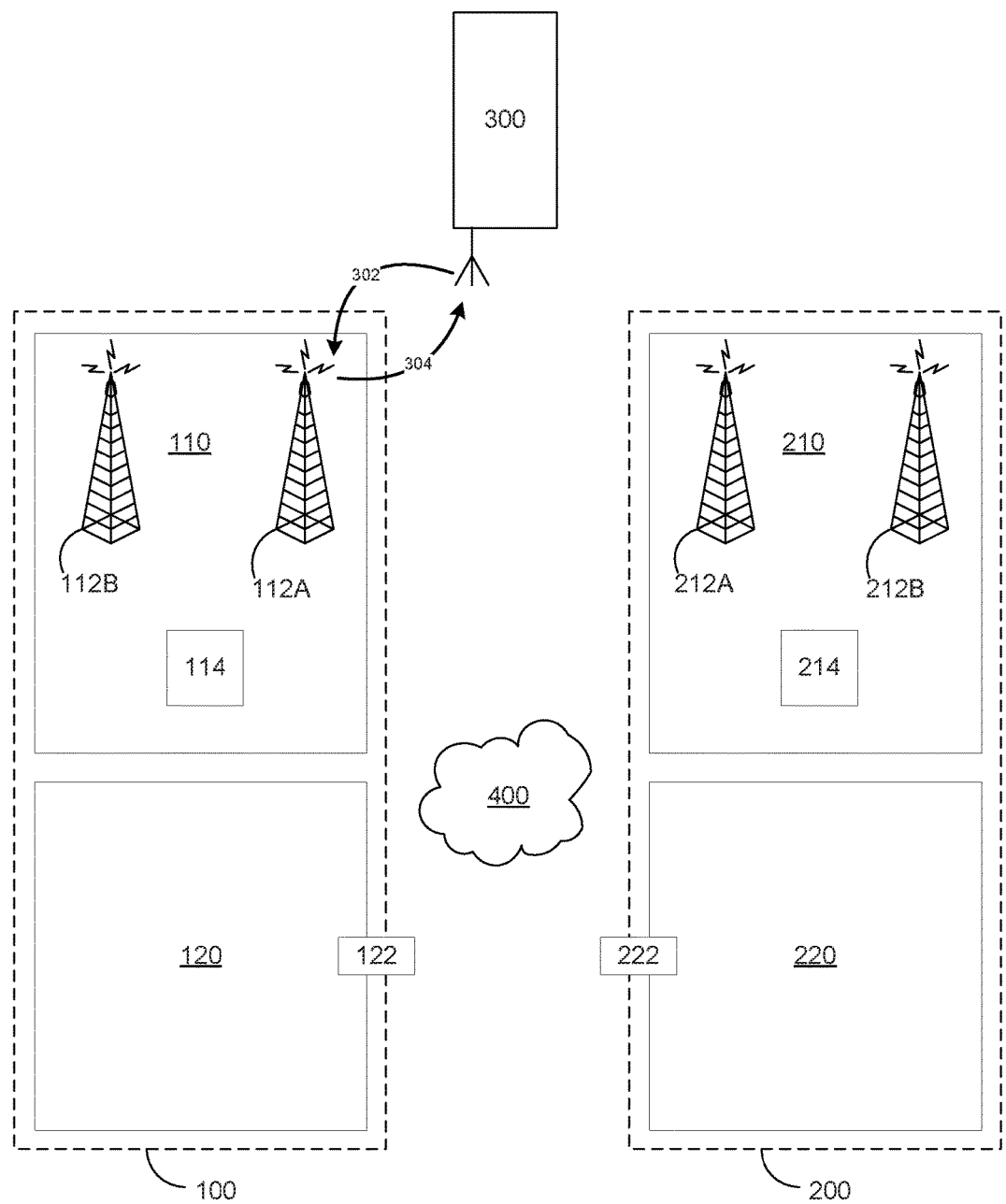
FIG. 1 is a block diagram depicting network infrastructure components of a first wireless network and a second wireless network, the first wireless network having physical uplink and downlink channels with a mobile station as well as bearers configured to provide bearer services to the mobile station.

Methods are described herein that facilitate attachment of a mobile station (MS) to a target wireless network through a physical connection between the MS and a separate wireless network to which the MS has previously attached. A resource control connection is established between the MS and the target network during a procedure by which the MS is attached to the target wireless network. The resource control connection includes an uplink channel between the MS and the target wireless network that includes a physical uplink channel between the MS and the supporting network (i.e. the wireless network to which the MS had previously attached). Similarly, the resource control connection includes a downlink channel between the MS and the target wireless network that includes a physical downlink channel between the MS and the supporting network.

Methods are also described herein that utilize resource control connections between an MS and a target network to establish service uplink channels that include a physical uplink channel between the MS and a supporting network and service downlink channels that include a physical downlink channel between the MS and a supporting network. The service uplink channels and service downlink channels can be utilized to provide services from the target network to the MS. The service uplink channels and service downlink channels tunnel through the supporting network.

Methods are additionally described herein that facilitate a hand over of a MS from a first cell of a target wireless network to a second cell of the target wireless network by utilizing physical uplink and downlink channels between the MS and a supporting wireless network. A handover initiation message is transmitted through either the physical uplink channel between the MS and the supporting wireless network and the physical downlink channel between the MS and the supporting wireless network. The handover initiation message is tunneled across the supporting wireless network and triggers the establishment of one or more resource control connections between the MS and the target wireless network.

Wireless networks are described herein that establish uplink and downlink channels with a mobile station by utilizing physical uplink and downlink channels between the mobile station and a separate, supporting wireless network. Wireless networks establish uplink and downlink channels with a mobile station by utilizing a resource control connection that includes a tunnel through the supporting wireless network. Wireless networks that are described herein utilize the tunneled resource control connection to establish uplink and downlink channels that include tunnels through the supporting wireless network. The tunneled resource control connections and the tunneled uplink and downlink channels tunnel through both the core network portion and the access network portion of the supporting wireless network. The tunneled resource control connection and the tunneled uplink and downlink channels include physical uplink and downlink channels between the mobile station and the access network portion of the supporting wireless network.

Wireless networks are described herein that support uplink and downlink channels between a mobile station and one or more dependent networks. Support networks allocate resources to physical uplink and downlink channels with mobile stations upon which dependent networks depend for exchanging communications with the mobile stations. Support networks allocate resources to uplink and downlink channels that tunnel through their core networks and support connectivity between mobile stations and dependent networks.

MSs are described herein that utilize physical uplink and downlink channels with a first wireless network to attach to one or more additional wireless networks and to initiate hand over procedures within those one or more additional networks. MSs connected to the first wireless network transmit attachment requests across a physical uplink channel with an access network portion of the first wireless network. The MSs thereafter establish resource control connections with the one or more additional wireless networks in order to establish service uplink channels and service downlink channels with the one or more additional wireless networks. The service uplink and service downlink channels that are established tunnel through the core network and access network of the first wireless network and that utilize the physical uplink and physical downlink channels between the MS and the first wireless network. MSs are described herein that can utilize the service uplink channels and service downlink channels with the one or more additional wireless networks to execute hand over procedures on any of the one or more additional wireless networks.

MSs are described herein that include one or more data structures that store network interface information and network subscription information for multiple wireless networks. MSs described herein can utilize the information stored in such data structures in order to maintain simultaneous attachment to multiple wireless networks through a physical connection with only a single wireless network. In this manner, MSs described herein can maintain simultaneous attachment with multiple wireless networks despite being equipped with only a single RF transceiver. MSs described herein can further utilize the information stored in such data structures to simultaneously transmit information to multiple wireless networks through a single RF transceiver and to simultaneously receive information from multiple wireless networks through a single RF transceiver.

The physical layer of the network between the MSs and BSSs of embodiments described herein can be divided into a Physical Link sublayer (PLL) and a Physical RF sublayer (RFL). The RFL performs the modulation and demodulation of the physical waveforms. The carrier frequencies, radio channel structures, and raw channel data rates are specified, as well as transmitter and receiver characteristics and performance requirements. The PLL provides services for information transfer over a physical channel between the MS and the network. These functions include data unit framing, data coding, and the detection and correction of physical medium transmission errors. In alternative embodiments, the physical layer of the network between the MSs and BSSs described herein can be divided into additional sublayers that collectively perform the operations of the physical layer. The systems and methods described herein can be implemented in a variety of environments having physical layers with a variety of different means for transmitting information.

The data link layer of the network between the MSs and BSSs of embodiments described herein can also be separated into two distinct sublayers. The Radio Link Control/Medium Access Control (RLC/MAC) sublayer arbitrates access to the shared medium between a multitude of MSs and the network. The RLC/MAC layer encompasses the efficient multiplexing of data and signaling information, and performs contention resolution, QoS control(limited), and error handling. The MAC itself can be derived from a slotted reservation ALOHA protocol, and operates between the MS and BSS. For retransmission of erroneous frames, an automatic selective repeat request (SREJ-ARQ) mechanism can be applied. In alternative embodiments, the data link layer of the network between the MSs and BSSs of embodiments described herein can be divided into further sublayers that collectively perform the operations required of the data link layer.

FIGS. 1-4 are block diagrams depicting network infrastructure components of two separate and distinct wireless wide area networks (WWANs) 100 and 200, which are connected across the Internet 400, and further depict a mobile station (MS) 300. In various embodiments, the first WWAN 100 and the second WWAN 200 may adhere to any of a variety of wireless network standards, e.g. the Global System for Mobile Communications (GSM) standard, the Universal Mobile Telecommunications System (UMTS), the Interim Standard 95 (IS-95) standard, the CDMA-2000 standard, and the Long Term Evolution (LTE) standard. In FIGS. 1-4, bearer services of WWANs 100 and 200 vary, and therefore so do their configurations and network resource allocations. Various embodiments of the systems described herein can include additional components not depicted in FIGS. 1-4. Similarly, various embodiments of the systems described herein may not include all of the components depicted in FIGS. 1-4. Embodiments of systems described herein may include more than two wireless networks. Embodiments of systems described herein may include only a single network having a generic access network (GAN) component while other embodiments may include two or more networks having GAN components. Methods described herein can be practiced, in various implementations, in any of a variety of system embodiments, including those with more than two wireless networks.

Figure 2:
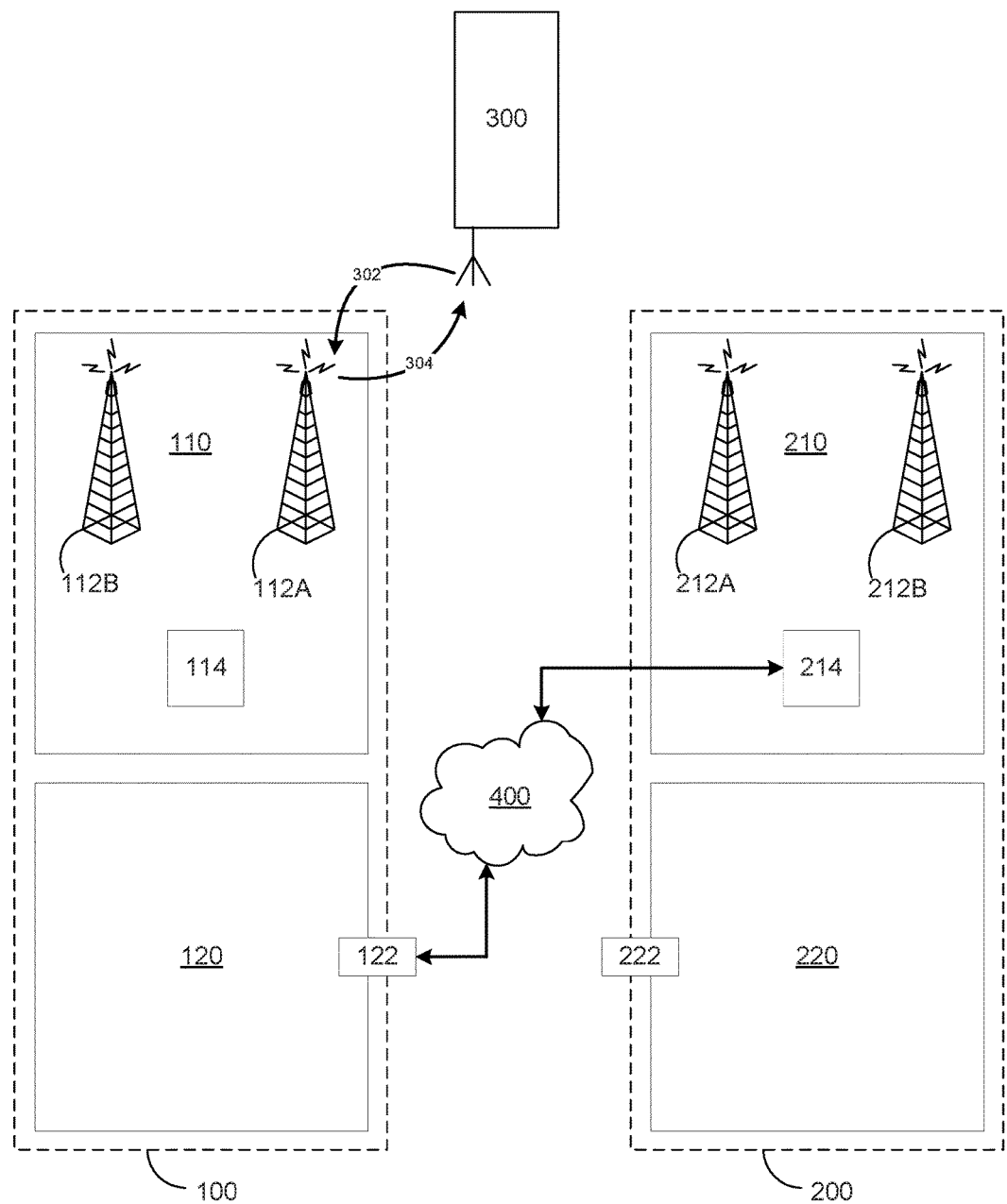
FIG. 2 is a block diagram depicting network infrastructure components of a first wireless network and a second wireless network each having bearers configured to provide bearer services to a mobile station, the first wireless network also having physical uplink and downlink channels with the mobile station.

Similarly, in FIGS. 1-4, a subscription management engine of the MS 300 accesses a subscription information data store that has various configurations in each of FIGS. 1-4. The subscription information data store of the MS 300 can store different relationships between different network interface parameters and different network subscription profiles in each of the different configurations. For example, in FIG. 2, the subscription information data store of the MS 300 stores a mobile identification number (MIN), a mobile directory number (MDN), and a mobile subscriber integrated services digital network-number (MSISDN) assigned by the WWAN 200. In the FIG. 2, the subscription information data store of the MS 300 also stores an association relationship between the MIN, the MDN, and the MSISDN assigned by the WWAN 200 and an address of a generic access network controller (GANC) 214. However, in FIG. 3, the subscription information data store of the MS 300 stores an association relationship between the MIN, MDN, and MSISDN assigned by the WWAN 200 and an address of a component of a second access network 210. In FIG. 2, the subscription information data store of the MS 300 stores a first temporary mobile subscriber identity (TMSI) assigned by the WWAN 200 and an association relationship between the first TMSI and the MIN, MDN, and MSISDN assigned by the WWAN 200. However, in FIG. 3, the subscription information data store of the MS 300 stores a different TMSI assigned by the WWAN 200 and an association relationship between the first TMSI and either the same MIN, MDN, and MSISDN assigned by WWAN 200 or a different MIN, MDN, and MSISDN assigned by the WWAN 200. In alternative embodiments, different network communication and network subscriptions are stored at the subscription information data store.

The first WWAN 100 includes a first access network 110 and a first core network 120, while the second WWAN 200 includes the second access network 210 and a second core network 220. The first access network 110 and the second access network 210 each include a plurality of transceivers.

The first access network 110 includes transceivers 112A and 112B and the second access network 210 includes transceivers 212A and 212B. The transceivers are utilized by the access networks 110 and 210 to provide physical uplink and physical downlink channels with the mobile station 300 over an air interface. The access network 110 and 210 provide for uplink and downlink channel separation, which depending on the wireless communication standard upon which the WWANs 100 and 200 are based, can be implemented according to any of time-division multiple access (TDMA), frequency-division multiple access (FDMA), code-division multiple access (CDMA), and orthogonal frequency multiple division access (OFDMA). The access networks 110 and 210 can also implement downlink channel separation according to alternative schemes for dividing of resources, e.g. physical layer resources.

The MS 300 includes a mobile termination component that supports functions that include radio transmission and handover, signaling, and access to a universal integrated circuit card (UICC). The UICC stores an international mobile subscription identifier (IMSI) and additional data. The mobile termination component has an international mobile equipment identity (IMEI) code attached to it and also has access to a subscription information data store. The subscription information data store may be located at the UICC or may be located elsewhere at the MS 300. The subscription information data store contains data structures that include values corresponding to one or more network interface identifiers of one or more wireless network interfaces, e.g. network interfaces of WWANs 100 and 200. The subscription information data store also stores values that correspond to parameters of subscriptions with one or more wireless networks, e.g. WWANs 100 and 200. In addition, the subscription information data store stores relationships between network interface identifiers. For example, the subscription information data store can store mapping relationships between particular services provided by WWANs 100 and 200 and particular network gateway identifiers.

The access network 110 and the access network 210 further include generic access network controller (GANC) 114 and the GANC 214, respectively. The GANC 114 and the GANC 214 contribute to providing generic access networks that enable the MS 300 to establish uplink and downlink channels across the Internet 400 with the first WWAN 100 and the second WWAN 200, respectively. The GANCs 114 and 214 thereby enable the MS 300 to utilize services provided by the WWANs 100 and 200 without establishing physical uplink and downlink channels across an air interface. For example, the MS 300 can utilize a Wi-Fi connection to the Internet to execute an attachment procedure to register with the WWAN 100 and the WWAN 200 through the gateways supported by the GANC 114 and the GANC 214, respectively.

The core network 120 and the core network 220 provide gateways, i.e. first core network gateway 122 and second core network gateway 222, through which transmissions may sent to and across the Internet 400 and through which transmissions may be received from the Internet 400. The core networks 120 and 220 also provide services to mobile stations that are connected to the access networks 110 and 210, respectively. The services provided by the core networks 120 and 220 include authentication, network configuration, network provisioning, service invocation, routing, addressing, data hosting, and error reporting, among others. The core networks 120 and 220 include components that receive attach requests from the MS 300 and issue service requests in response to the receipt of the attach requests. The service requests issued by the core networks 120 and 220 in response to the receipt of attach requests and handover initiation requests from the MS 300 facilitate establishment and configuration of network resources. Specifically, components of the core networks 120 and 220 issue service requests that establish the assignment of mobile stations to physical uplink channels and physical downlink channels with the access networks 110 and 210, respectively.

In various embodiments, one or both of the first WWAN 100 and the second WWAN 200 are based on one of the GSM or UMTS standards. In such embodiments, one or both of the first access network 110 and the second access network 210 are UMTS radio access networks (UTRANs), and one or both of the first core network 120 and the second core network 220 are general packet radio service (GPRS) core networks (GPRS CNs). Network infrastructure components that form a UTRAN include a Node B, which would include the transceivers 112A and 112B (if the first WWAN is based on the GSM or UMTS standards) and the transceivers 212A and 212B (if the second WWAN is based on the GSM or UMTS standards). Network infrastructure components that form a GPRS CN include a Serving GPRS support node (SGSN) and a Gateway GRPS support node (GGSN). GPRS CNs support GPRS tunneling protocol (GTP) for the transmission of packets received by UTRANs to the Internet 400 and to components of the GPRS CN. For example, if WWAN 100 is based on the GSM or UMTS standard, a transmission received by the first access network 110 from the MS 300 can be forwarded, with GTP, to a gateway to the Internet 400 located in the first core network 120. GTP includes GTP-C, which is used within the GPRS CN for signaling between GGSNs and SGSNs, GTP-U, which is used for carrying user data within the GPRS CN and between the UTRAN and the GPRS CN, and GTP', which is used to deliver charging data to a network operator's billing center.

In various embodiments of the invention, one or both of the first WWAN 100 and the second WWAN 200 are based on the LTE standard. In such embodiments, one or both of the first access network 110 and the second access network 210 are evolved UMTS radio access networks (E-UTRANs), and one or both of the first core network 120 and the second core network 220 are evolved packet cores (EPCs), i.e. system architecture evolution (SAE) cores. Network infrastructure components that form an E-UTRAN include evolved Node Bs (eNBs), which would include the transceivers 112A and 112B (if the first WWAN is based on the LTE standard) and the transceivers 212A and 212B (if the second WWAN 200 is based on the LTE standard). Network infrastructure components that form an EPC include a mobility management entity (MME), a serving gateway (SGW), and a packet data network (PDN) gateway (PGW). EPCs support the EPC protocol stack for transmission of packets received by E-UTRANs to the Internet 400 and to various components of the EPC. The EPC protocol stack includes MME protocols, SGW protocols, and PGW protocols. The MME protocols include the S1-MME protocol stack to support S1-MME interfaces with eNBs, the S11 protocol stack to support S11 interfaces with SGWs, stream control transmission protocol (SCTP), and S1 Application Part (S1AP). SGW protocols include the S11 control plane stack to support S11 interfaces with MMEs, the S5/S8 control and data plane stacks to support S5/S8 interfaces with PGWs, the S1 data plane stack to support S1 user plane interfaces with eNBs, and the S4 data plane stack to support S4 user plane interfaces between RNCs of UMTS and SGWs of eNBs. The PGW protocols include the S5/S8 control and data plane stacks to support S5/S8 interfaces with SGWs. The integrated data plane stack for the S5/S8 interface consists of IP, UDP, and eGTP-U protocols.

In various embodiments, the first WWAN 100 may be based upon the same wireless communication standard upon which the second WWAN 200 is based, or the first WWAN 100 may be based upon a different wireless communication standard than that upon which the WWAN network 200 is based. Thus, in various embodiments, network protocols supported by the first WWAN 100 are not supported by the second WWAN 200, while in other embodiments, the network protocols supported by the first WWAN 100 are also supported by the second WWAN 200. Similarly, the first WWAN 100 and the second WWAN 200 may be operated by different service providers.

FIG. 1 is a block diagram depicting network infrastructure components of a first wireless network and a second wireless network, the first wireless network having physical uplink and downlink channels with a mobile station as well as bearers configured to provide bearer services to the mobile station. In the configuration depicted in FIG. 1, the first WWAN 100 has allocated resources to providing services to the MS 300. In other words, the first WWAN 100 and the MS 300 have previously executed a network attachment procedure in which the first WWAN 100 registered the MS 300 and allocated resources for providing services to the MS 300.

In the configuration depicted in FIG. 1, the first WWAN 100 has established one or more bearer services used to transfer data to and from the MS 300. The established bearer services include, or utilize for data transfer, the physical uplink channel 302 between the MS 300 and the transceiver 112A and the physical downlink channel 304 between the MS 300 and the transceiver 112A. The established bearer services also include, or utilize in transferring data, data structures stored at components of the WWAN 100. Specifically, the data structures are stored at physical processor-readable memory of components of the core network 120 and at physical, processor-readable memory of components of the access network 110. The data structures indicate an assignment of one or more resources of the WWAN 100 to one or more identifiers of the MS 300. For example, the data structures include a bearer table that maps a mobile equipment identity (MEI) of the MS 300 to the physical uplink channel 302 and the physical downlink channel 304. The bearer table further maps the MEI of the MS 300 to a particular division of the physical uplink channel 302 and to a particular division of the physical downlink channel 304. Such a bearer table may further include an association, or mapping relationship, between an IMSI stored at the MS 300 and various resources of the WWAN 100. Additionally, the data structures that indicate an assignment of resources of the WWAN 100 may further include a mobile subscriber integrated services digital network-number (MSISDN), and a globally unique temporary identifier (GUTI) assigned to the MS 300.

In the configuration depicted in FIG. 1, the MS 300 has a subscription information data store at which network interface identifiers corresponding to network interfaces of the WWAN 100 are stored and associated with subscription parameters corresponding to a subscription with the WWAN 100. The subscription information data store of the MS 300 can store an MIN, an MDN, and an MSISDN assigned to the MS 300 by the WWAN 100 and a relationship between the MSISDN and various access point names (APNs) or an address of a packet data network (PDN) of the WWAN 100. For example, the subscription information data store of the MS 300 can also store a variety of parameters related to the physical uplink channel 302 and the physical downlink channel 304 and an association relationship between such parameters and an MIN, MDN, or MSISDN assigned to the MS 300 by the WWAN 100. Certain portions of the subscription information data stored at the MS 300 can be information that is received following the execution of an attachment procedure between the MS 300 and the WWAN 100.

FIG. 2 is a block diagram depicting network infrastructure components of a first wireless network and a second wireless network each having bearers configured to provide bearer services to a mobile station, the first wireless network also having physical uplink and downlink channels with the mobile station. In the configuration depicted in FIG. 2, both the first WWAN 100 and the second WWAN 200 have allocated resources to providing services to the MS 300. In other words, the first WWAN 100 and the MS 300 have previously executed a network attachment procedure in which the first WWAN 100 registered the MS 300 and allocated resources for providing services to the MS 300. Similarly, the second WWAN 200 and the MS 300 have also previously executed a network attachment procedure in which the first WWAN 100 registered the MS 300 and allocated resources for providing services to the MS 300.

In the configuration depicted in FIG. 2, both the first WWAN 100 and the second WWAN 200 have established one or more bearer services used to transfer data to and from the MS 300. The bearer services established by the WWAN 100 for the MS 300 include, or utilize for data transfer, the physical uplink channel 302 between the MS 300 and the transceiver 112A and the physical downlink channel 304 between the MS 300 and the transceiver 112A. The bearer services established by the WWAN 100 for the MS 300 also include, or utilize in transferring data, data structures stored at components of the WWAN 100. Specifically, the data structures are stored at physical processor-readable memory of components of the core network 120 and at physical, processor-readable memory of components of the access network 110. The data structures indicate an assignment of one or more resources of the WWAN 100 to one or more identifiers of the MS 300. For example, the data structures include a bearer table that maps a mobile equipment identity (MEI) of the MS 300 to the physical uplink channel 302 and the physical downlink channel 304. The bearer table further maps the MEI of the MS 300 to a particular division of the physical uplink channel 302 and to a particular division of the physical downlink channel 304. The bearer services established by the WWAN 200 for the MS 300 include, or utilize for data transfer, a gateway 122 between the WWAN 100 and the Internet 400. The bearer services established by the WWAN 200 for the MS 300 also include, or utilize in transferring data, data structures stored at components of the WWAN 200. Specifically, the data structures are stored at physical processor-readable memory of components of the core network 220 and at physical, processor-readable memory of the GANC 214. The data structures indicate an assignment of one or more resources of the WWAN 200 to one or more identifiers of the gateway 122 and to one or more identifiers of the MS 300. For example, the data structures include a bearer table that maps a mobile equipment identity (MEI) of the MS 300 to the GANC 214 and to the gateway 122.

In the configuration depicted in FIG. 2, the MS 300 has a subscription information data store at which network interface identifiers corresponding to network interfaces of the WWAN 100 are stored and associated with subscription parameters corresponding to a subscription with the WWAN 100. Furthermore, the subscription information data store at the MS 300 contains network interface identifiers corresponding to network interfaces of the WWAN 200 and an association between such interfaces and subscription parameters corresponding to a subscription with the WWAN 200. For example, the subscription information data store of the MS 300 can store an MSISDN assigned to the MS 300 by the WWAN 200 and an association relationship between the MSISDN assigned by the WWAN 200 and a network interface parameter corresponding to the GANC 214. Furthermore, the subscription information data store of the MS 300 can store an association relationship between the MSISDN assigned to the MS 300 by the WWAN 200 and a variety of parameters related to the physical uplink channel 302 and the physical downlink channel 304.

Figure 3:
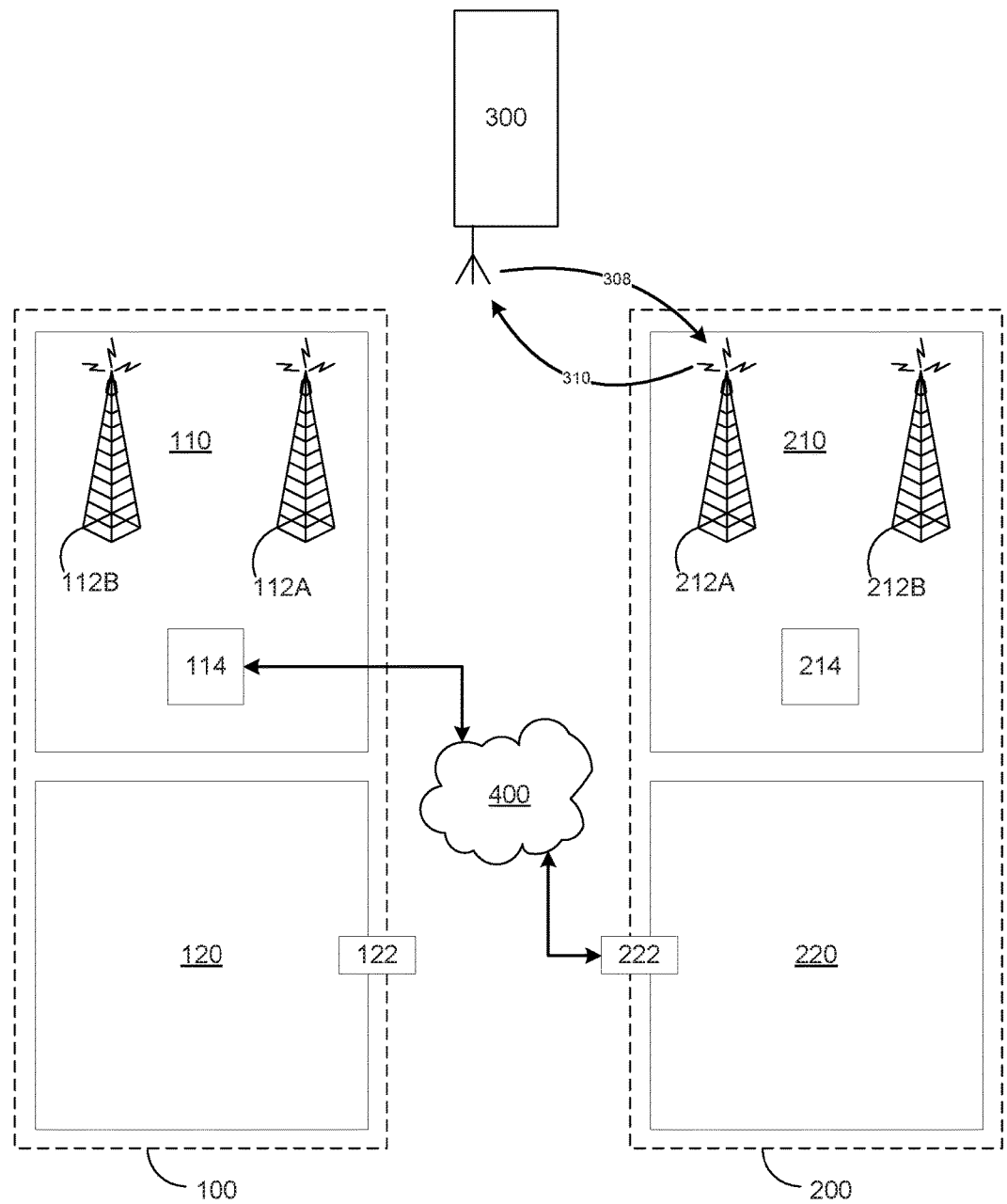
FIG. 3 is a block diagram depicting network infrastructure components of a first wireless network and a second wireless network each having bearers configured to provide bearer services to a mobile station, the second wireless network also having physical uplink and downlink channels with the mobile station.

FIG. 3 is a block diagram depicting network infrastructure components of a first wireless network and a second wireless network each having bearers configured to provide bearer services to a mobile station, the second wireless network also having physical uplink and downlink channels with the mobile station. In the configuration depicted in FIG. 3, both the first WWAN 100 and the second WWAN 200 have allocated resources to providing services to the MS 300. In other words, the first WWAN 100 and the MS 300 have previously executed a network attachment procedure in which the first WWAN 100 registered the MS 300 and allocated resources for providing services to the MS 300. Similarly, the second WWAN 200 and the MS 300 have also previously executed a network attachment procedure in which the first WWAN 100 registered the MS 300 and allocated resources for providing services to the MS 300.

In the configuration depicted in FIG. 3, both the first WWAN 100 and the second WWAN 200 have established one or more bearer services used to transfer data to and from the MS 300. The bearer services established by the WWAN 100 for the MS 300 include, or utilize for data transfer, a gateway 222 between the WWAN 200 and the Internet 400. The bearer services established by the WWAN 100 for the MS 300 also include, or utilize in transferring data, data structures stored at components of the WWAN 100. Specifically, the data structures are stored at physical processor-readable memory of components of the core network 120 and at physical, processor-readable memory of the GANC 114. The data structures indicate an assignment of one or more resources of the WWAN 100 to one or more identifiers of the gateway 222 and to one or more identifiers of the MS 300. For example, the data structures include a bearer table that maps a mobile equipment identity (MEI) of the MS 300 to the GANC 114 and to the gateway 222. The bearer services established by the WWAN 200 for the MS 300 include, or utilize for data transfer, a physical uplink channel 308 between the MS 300 and the transceiver 212A and a physical downlink channel 310 between the MS 300 and the transceiver 212A. The bearer services established by the WWAN 200 for the MS 300 also include, or utilize in transferring data, data structures stored at components of the WWAN 200. Specifically, the data structures are stored at physical processor-readable memory of components of the core network 220 and at physical, processor-readable memory of components of the access network 210. The data structures indicate an assignment of one or more resources of the WWAN 200 to one or more identifiers of the MS 300. For example, the data structures include a bearer table that maps a mobile equipment identity (MEI) of the MS 300 to the physical uplink channel 308 and the physical downlink channel 310. The bearer table further maps the MEI of the MS 300 to a particular division of the physical uplink channel 308 and to a particular division of the physical downlink channel 310.

In the configuration depicted in FIG.3, the MS 300 has a subscription information data store at which network interface identifiers corresponding to network interfaces of the WWANs 100 and 200 are stored and associated with subscription parameters corresponding to subscriptions between the MS 300 and the WWANs 100 and 200. For example, the subscription information data store of the MS 300 can store an MSISDN assigned to the MS 300 by the WWAN 100 and an association relationship between the MSISDN assigned by the WWAN 100 and a network interface parameter corresponding to the GANC 114. Furthermore, the subscription information data store of the MS 300 can store an association relationship between the MSISDN assigned to the MS 300 by the WWAN 100 and a variety of parameters related to the physical uplink channel 308 and the physical downlink channel 310.

Figure 4:
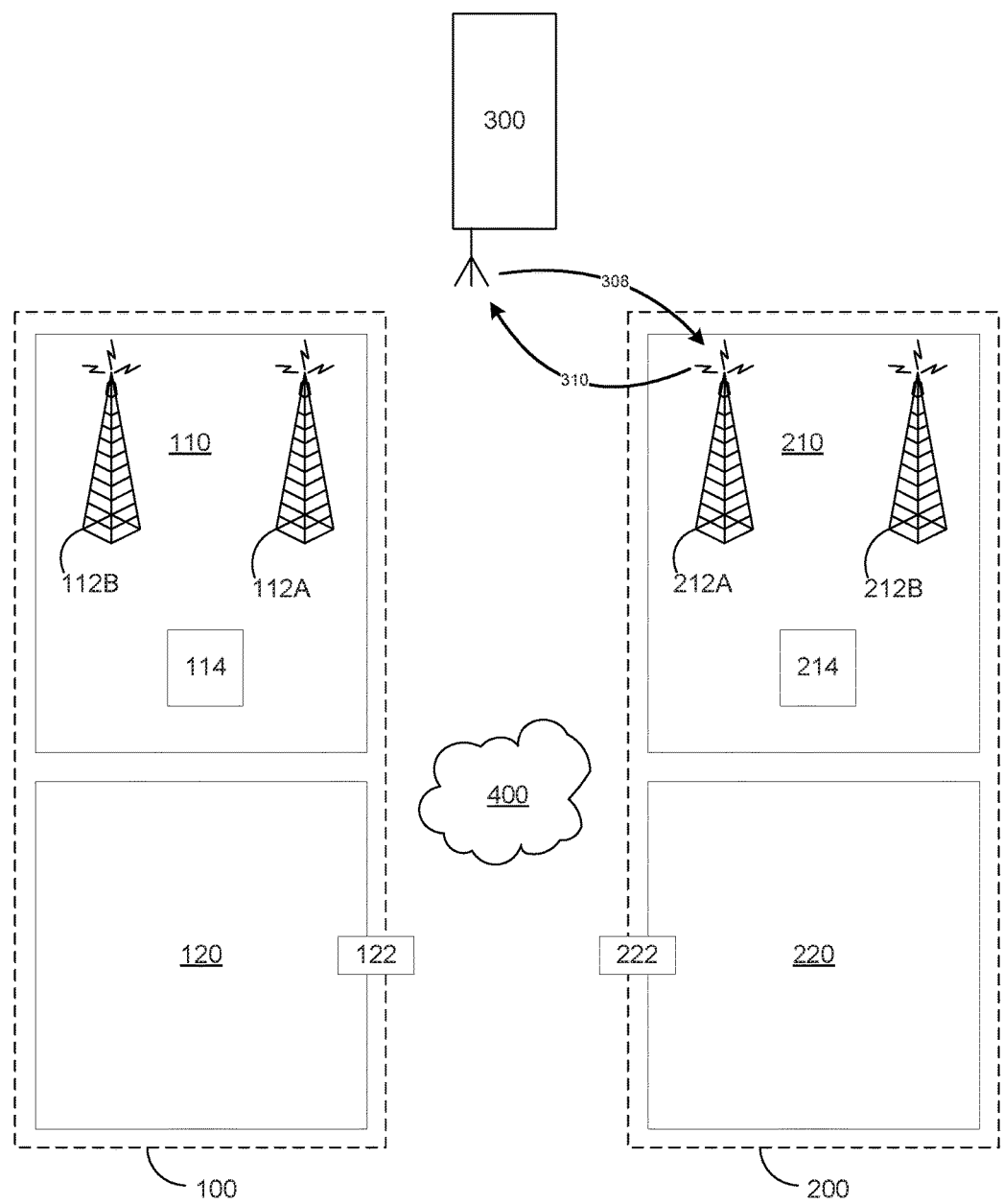
FIG. 4 is a block diagram depicting network infrastructure components of a first wireless network and a second wireless network, the second wireless network having physical uplink and downlink channels with a mobile station as well as bearers configured to provide bearer services to the mobile station.

FIG. 4 is a block diagram depicting network infrastructure components of a first wireless network and a second wireless network, the second wireless network having physical uplink and downlink channels with a mobile station as well as bearers configured to provide bearer services to the mobile station. In the configuration depicted in FIG. 4, the first WWAN 200 has allocated resources to providing services to the MS 300. In other words, the first WWAN 200 and the MS 300 have previously executed a network attachment procedure in which the first WWAN 200 registered the MS 300 and allocated resources for providing services to the MS 300. Specifically, in the configuration depicted in FIG. 4, the first WWAN 200 has established one or more bearer services used to transfer data to and from the MS 300. The established bearer services include, or utilize for data transfer, the physical uplink channel 308 between the MS 300 and the transceiver 212A and the physical downlink channel 310 between the MS 300 and the transceiver 212A. The established bearer services also include, or utilize in transferring data, data structures stored at components of the WWAN 200. Specifically, the data structures are stored at physical processor-readable memory of components of the core network 220 and at physical, processor-readable memory of components of the access network 210. The data structures indicate an assignment of one or more resources of the WWAN 200 to one or more identifiers of the MS 300. For example, the data structures include a bearer table that maps a mobile equipment identity (MEI) of the MS 300 to the physical uplink channel 308 and the physical downlink channel 310. The bearer table further maps the MEI of the MS 300 to a particular division of the physical uplink channel 308 and to a particular division of the physical downlink channel 310.

In the configuration depicted in FIG. 1, the MS 300 has a subscription information data store at which network interface identifiers corresponding to network interfaces of the WWAN 200 are stored and associated with subscription parameters corresponding to a subscription with the WWAN 200. For example, the subscription information data store of the MS 300 can also store a variety of parameters related to the physical uplink channel 308 and the physical downlink channel 310 and an association relationship between such parameters and an MSISDN assigned to the MS 300 by the WWAN 200.

The WWANs 100 and 200 can transition from the configuration depicted in FIG. 1 to the configuration depicted in FIG. 2 as a result of the WWAN 200 completing an attach procedure with the MS 300 via a resource control connection tunneled through the WWAN 100. Similarly, the WWANs 100 and 200 can transition from the configuration depicted in FIG. 4 to the configuration depicted in FIG. 3 as a result of the WWAN 100 completing an attach procedure with the MS 300 via a resource control connection tunneled through the WWAN 200.

Systems and methods are described herein that contemplate transitions between the configurations depicted in FIG. 1 and FIG. 4 (i.e. from the configuration depicted in FIG. 1 to the configuration depicted in FIG. 4 or vice versa) in which intermediate configurations are realized. Intermediate configurations in such transitions are depicted in FIG. 2 and FIG. 3. For example, systems and methods are described herein that contemplate transitions from the configuration depicted in FIG. 1 to the configuration depicted in FIG. 2 to the configuration depicted in FIG. 4. Similarly, systems and methods are described herein that contemplate transitions from the configuration depicted in FIG. 4 to the configuration depicted in FIG. 3 to the configuration depicted in FIG. 1. Alternative systems and methods are described herein that contemplate transitions from the configuration depicted in FIG. 1 to the configuration depicted in FIG. 3 during which an intermediate configuration as depicted in FIG. 2 is realized. Similarly, further systems and methods are described herein that contemplate transitions from the configuration depicted in FIG. 4 to the configuration depicted in FIG. 2 during which an intermediate configuration as depicted in FIG. 3 is realized. In such systems and methods, the intermediate configurations provide a position from which the desired final configuration can be achieved very quickly that further provide functionality equivalent to that afforded by the initial configuration.

Systems and methods described herein that contemplate transitions between various configuration depicted in FIG. 1 through 4 that realize the intermediate configurations depicted in FIG. 2 and FIG. 3 can provide for retaining the intermediate configurations depicted in FIG. 2 and FIG. 3 for various time intervals. The duration of such time intervals can be indefinite, e.g. can be determined by the satisfaction of a condition. Alternatively, the duration of such time intervals can be specified. Systems and methods described herein provide for maintaining an intermediate configuration in which MS 300 is simultaneously attached to both of the WWANs 100 and 200 for a period of time that is longer than a duration of a time interval at which one of the WWAN 100 or the WWAN 200 requires the MS 300 to periodically transmit a location update request to avoid being considered switched off or unreachable. Systems and methods described herein also provide for, upon determining that an intermediate configuration has been maintained for a period of time that is within a threshold duration of a maximum duration that one of the WWAN 100 or the WWAN 200 allows for a mobile station to remain connected to a GAN, automatically returning to an initial configuration from the intermediate configuration or automatically transitioning to a final configuration from the intermediate configuration. Such a threshold duration may be defined according to a specified quantity of time or according to a number of location update requests that have been transmitted since the mobile station became connected to the GAN. The automatic return to the initial configuration or the automatic transition to the final configuration can also be triggered by application usage locally at the MS 300 or by determining that a particular process or particular class of processes is being executed at the MS 300. An automatic transition to the final configuration can also be triggered by a signal strength measurement. For example, if the MS 300 determines that the signal strength from WWAN 100 in the configuration depicted in FIG. 2 is below a threshold the MS 300 may transition to the configuration depicted in FIG. 4. In some implementations intermediate configurations can be maintained for more than an hour or more than a day.

Implementations described herein that provide for an automatic return to an initial configuration under such circumstances can also provide for a subsequent automatic return to the intermediate configuration or an automatic transition to a different intermediate configuration. Implementations that include more than two wireless networks can provide for an automatic transition to an intermediate configuration in which a GAN is accessed through a different network than it was accessed during a prior initial configuration from which an automatic return to the initial configuration was executed. The duration of an interval during which an initial configuration is maintained after an automatic return from an intermediate configuration and prior to a subsequent transition back to the intermediate condition or to a different intermediate condition (e.g. a return duration) can be determined according to a specified period of time or according to the satisfaction of a condition. A return duration can be determined according to an identity of a process being executed, a number of processes being executed, and a classification of a current executing process. A return duration can also be determined according to a duration of a time interval at which one of the WWAN 100 or the WWAN 200 requires the MS 300 to periodically transmit a location update request to avoid being considered switched off or unreachable.

The WWANs 100 and 200 and the MS 300 can transition from the configuration depicted in FIG. 2 to the configuration depicted in FIG. 3 as a result of the WWAN 100 executing a handover procedure through which the MS 300 is reassigned from resources including the transceiver 112A to resources including the GANC 114 and the WWAN 200 simultaneously executing a handover procedure through which the MS 300 is reassigned from resources including the GANC 214 to resources including the transceiver 212A. In order to transition directly from the configuration depicted in FIG. 2 to the configuration depicted in FIG. 3, the bearers established and configured to provide services to the MS 300 via the physical uplink channel 302 and the physical downlink channel 304 must remain assigned to the MS 300 while the MS 300 transmits all data necessary to initiate the handovers at both the WWAN 100 and the WWAN 200. Once all uplink data required to perform both handovers has been transmitted from the MS 300 to the first core network 120 and the second core network 220 and the second core network 220 has completed the bearer establishment and configuration necessary to provide services to the MS 300 via the physical uplink channel 308 and the physical downlink channel 310, the handover can be executed. Execution of the handover in the first WWAN 100 requires that handover downlink data can be delivered to the MS 300 through the second core network gateway 222. Delivery of handover downlink data from the first WWAN 100 to the MS 300 through the second core network gateway 222 may require that the MS 300 execute a new attachment procedure with the WWAN 100 through the second core network gateway 222, and therefore, through the physical uplink channel 308 and the physical downlink channel 310. Similarly, the WWANs 100 and 200 can transition from the configuration depicted in FIG. 3 to the configuration depicted in FIG. 2.

Depending on the configuration of the first core network 120 and the second core network 220 and the specifics of the configuration and allocation of resources for providing bearer services to the MS 300 prior to the transmission of the handover initiation requests, it may not be possible for the WWANs 100 and 200 to transition directly from the configuration depicted in FIG. 2 to FIG. 3. Instead the WWANs 100 and 200 may be required to transition through the configuration depicted in FIG. 4 in moving from the configuration depicted in FIG. 2 to the configuration depicted in FIG. 3. For example, the MS 300 may not be able to transmit sufficient handover initiation data to enable the WWAN 100 to establish bearers dedicated to providing services to the MS 300 through the core network gateway 222 until after the MS 300 transmits uplink data to the GANC 114 through the core network gateway 222. Additionally, during the establishment and configuration of bearers dedicated to providing services to the MS 300 through the physical uplink channel 308 and the physical downlink channel 310, a timeout event may occur during which the first WWAN 100 releases all bearers dedicated to the MS 300. Similarly, WWANs 100 and 200 may be required to transition through the configuration depicted in FIG. 1 in moving from the configuration depicted in FIG. 3 to the configuration depicted in FIG. 2.

The WWANs 100 and 200 and the MS 300 can also transition from the configuration provided by FIG. 2 to the configuration depicted in FIG. 4 as a result of the WWAN 100 executing a detach procedure with the MS 300 immediately prior to a handover of the MS 300 at the WWAN 200 in which the MS 300 is reassigned from resources including the GANC 214 to resources including the transceiver 212A. The WWANs 100 and 200 can similarly transition from the configuration depicted in FIG. 3 to the configuration depicted in FIG. 1 as a result of the WWAN 200 executing a detach procedure with the MS 300 immediately prior to a handover of the MS 300 at the WWAN 100 in which the MS 300 is reassigned from resources including the GANC 114 to resources including the transceiver 112A.

Figure 5:
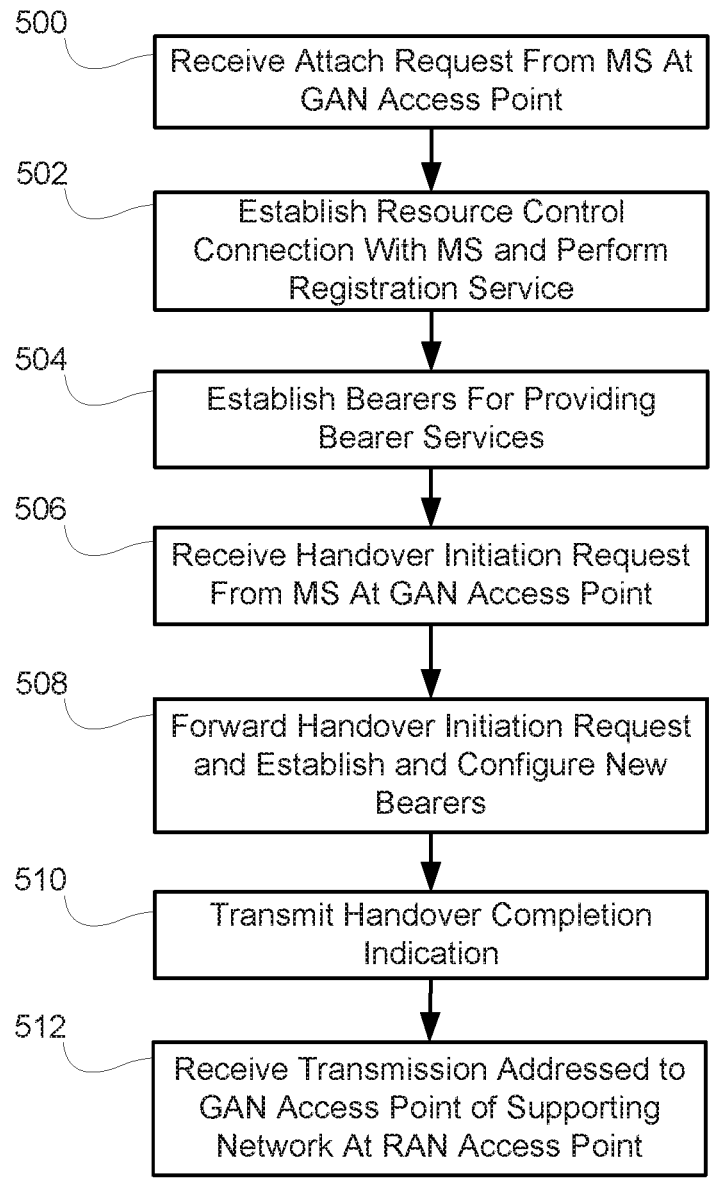
FIG. 5 is a flow diagram depicting a process by which a target wireless network executes an attachment procedure with a mobile station through a resource control connection that is tunneled through a supporting wireless network.

FIG. 5 is a flow diagram depicting a process by which a target wireless network executes an attachment procedure with a mobile station through a resource control connection that is tunneled through a supporting wireless network. Alternative processes are contemplated that may include processing not explicitly identified in FIG. 5 and that also may not include all of the processing explicitly identified in FIG. 5. Similarly, alternative processes are contemplated that perform processing identified in FIG. 5 in a different order than indicated by FIG. 5.

At 500, the first WWAN 100, the second WWAN 200, and the MS 300 are configured as depicted in FIG. 1 and the second WWAN 200 receives an attach request from the MS 300. The WWAN 200 receives the attach request at the GANC 214. The attach request received at the GANC 214 includes identification information pertaining to the MS 300. For example, if the WWAN 200 adheres to the LTE wireless network standard, the attach request received at 500 includes a mobile equipment identity (MEI) of the MS 300 as well as one or more of a globally unique temporary ID (GUTI) corresponding to the MS 300, a packet temporary international mobile subscriber identity (P-TMSI) corresponding to the MS 300, or an international mobile subscriber identity (IMSI) of the MS 300. The attach request also includes an attach type identifier that indicates that the attach request corresponds to, e.g. an initial attach procedure, a handover, or an emergency attach procedure.

The attach request also includes information pertaining to characteristics of a connection to be established between the WWAN 200 and the MS 300 or information pertaining to the services to be provided by the WWAN 200 to the MS 300. If the WWAN 200 conforms to the LTE standard, the attach request provides radio resource control (RRC) parameters that include, e.g., a Selected Network that indicates a selected public land mobile network (PLMN) and a globally unique mobility management entity identifier (GUMMEI) corresponding to a prior connection between the MS 300 and the WWAN 200.

Upon receiving the attach request at 500, the GANC 214 stores data included in the request in a data structure stored at a processor readable memory of the GANC 214 and also forwards the attach request or portions thereof to one or more components of the second core network 220. The second core network 220 utilizes data included in the request or the portions forwarded by the GANC 214 in order to perform various identification procedures and to begin the attachment procedure required to register the MS 300.

At 502 and 504, the configuration of the WWANs 100 and 200 transitions to that depicted by FIG. 2. At 502, the WWAN 200 establishes a resource control connection with the MS 300. The resource control connection established at 502 includes the physical uplink channel 302 and the physical downlink channel 304 and is utilized by the second core network 220 to exchange data transmissions with the MS 300 in order to perform a variety of functions attendant to attachment. At 502, the second core network 220 performs various registration services, e.g. identification, verification, authentication, and protocol configuration services. If the second core network 220 requires information from the MS 300 in order to perform any such services, the second core network 220 can transmit a request to the MS 300 via the resource control connection. The second core network 220 can also receive a response from the MS 300 via the resource control connection.

At 504, the core network 220 allocates resources of the WWAN 200 to the MS 300, or establishes bearers for providing bearer services to the MS 300. The allocation, or assignment, of resources of the WWAN 200 to the MS 300 includes establishing and configuring data structures stored at various components of the core network 220. For example, if the WWAN 200 conforms to the LTE standard, data structures recording an assignment of network resources to the MS 300 are located at processor readable memories of a mobility management entity (MME), a serving gateway (SGW), and a packet data network (PDN) gateway (PGW). The data structures indicate an assignment of one or more resources of the WWAN 100 to one or more identifiers of the MS 300. For example, the data structures include a bearer table that maps an MEI of the MS 300 to the first core network gateway 122. The bearer table thereby effectively maps the MEI of the MS 300 to the physical uplink channel 302 and the physical downlink channel 304. The allocation, or assignment, of resources of the WWAN 200 to the MS 300 constitutes the establishment of a service uplink channel and a service downlink channel between the WWAN 200 and the MS 300. The service uplink and service downlink channels, which include the first core network gateway 122 and the physical uplink channel 302 and the physical downlink channel 304, respectively, are tunneled through the first WWAN 100.

Once the core network 220 has allocated the resources of the WWAN 200 to the MS 300 at 504, the core network 220 may periodically perform integrity checks with the MS 300. The performance of integrity checks with the MS 300 includes transmission of an integrity check request response from the core network 220 of the WWAN 200 to the MS 300 through the WWAN 100. The MS 300 transmits an integrity check response message, or integrity verification response, addressed to the GANC 214 through the WWAN 100 in order to remain actively parked on the WWAN 200. In the event that the MS 300 repeatedly fails to respond to integrity checks, the WWAN 200 may be configured to release resources allocated to the MS 300. However, the WWAN 200 may be configured not to release, but instead maintain the assignment of, resources allocated to the MS 300. Therefore, by responding to integrity check requests from the core network 220, the MS 300 is able to remain simultaneously attached to both the WWAN 100 and to the WWAN 200.

At 506, the GANC 214 receives a handover initiation request from the MS 300 through the first core network gateway 122. The handover initiation request received by the GANC 214 at 506 passes through the first core network gateway 122 as well as an access point of a generic access network (GAN) that is a component of the WWAN 200 and that is supported by the GANC 214. The handover initiation request provides for a handover of the MS from the GAN supported by the GANC 214 to a radio access network (RAN) that includes the transceiver 212A. The RAN that includes the transceiver is a component of the WWAN 200. The handover initiation request received at 506 includes a variety of information. The information included in the handover initiation request received at 506 includes a variety of information pertaining to the current location of the MS 300 and may further include the types of information that were included in the attach request received at 500.

At 508, the GANC 214 forwards the handover initiation request to various components of the core network 220 in order to facilitate the establishment and configuration of bearers for providing bearer services to the MS 300 through the RAN that includes the transceiver 212A. At 510, the core network 220 allocates resources of the WWAN 200, including the physical uplink channel 308 and the physical downlink channel 310 (or divisions thereof) to the MS 300 and further establishes and configures data structures stored at various components of the core network 220 in order to support service provision to the MS 300 via the transceiver 212A. For example, if the WWAN 200 conforms to the LTE standard, data structures recording an assignment of the MS 300 to network resources that include the physical uplink channel 308 and the physical downlink channel 310 are located at processor readable memories of a mobility management entity (MME), a serving gateway (SGW), and a packet data network (PDN) gateway (PGW).

At 510, the WWAN 200 transmits an indication that the handover has completed to the MS 300 via the physical downlink channel 310. At 512, the WWAN receives a transmission from the MS 300 via the physical uplink channel 308 that is addressed to the GANC 114 of the first WWAN 100. The transmission received by the WWAN at 512 can be, in different implementations, an attach request or a data transmission for facilitating a handover of the MS from the RAN that includes the transceiver 112A to the GAN that is supported by the GANC 114. The transmissions sent at 508, 510, and 512, and the operations of service requests included therein, result in the WWANs 100 and 200 assuming the configuration depicted in FIG. 3. After 512, the WWAN 100 and the MS 300 may execute a detach procedure following which the WWANs 100 and 200 will have the configuration depicted in FIG. 4.

Figure 6:
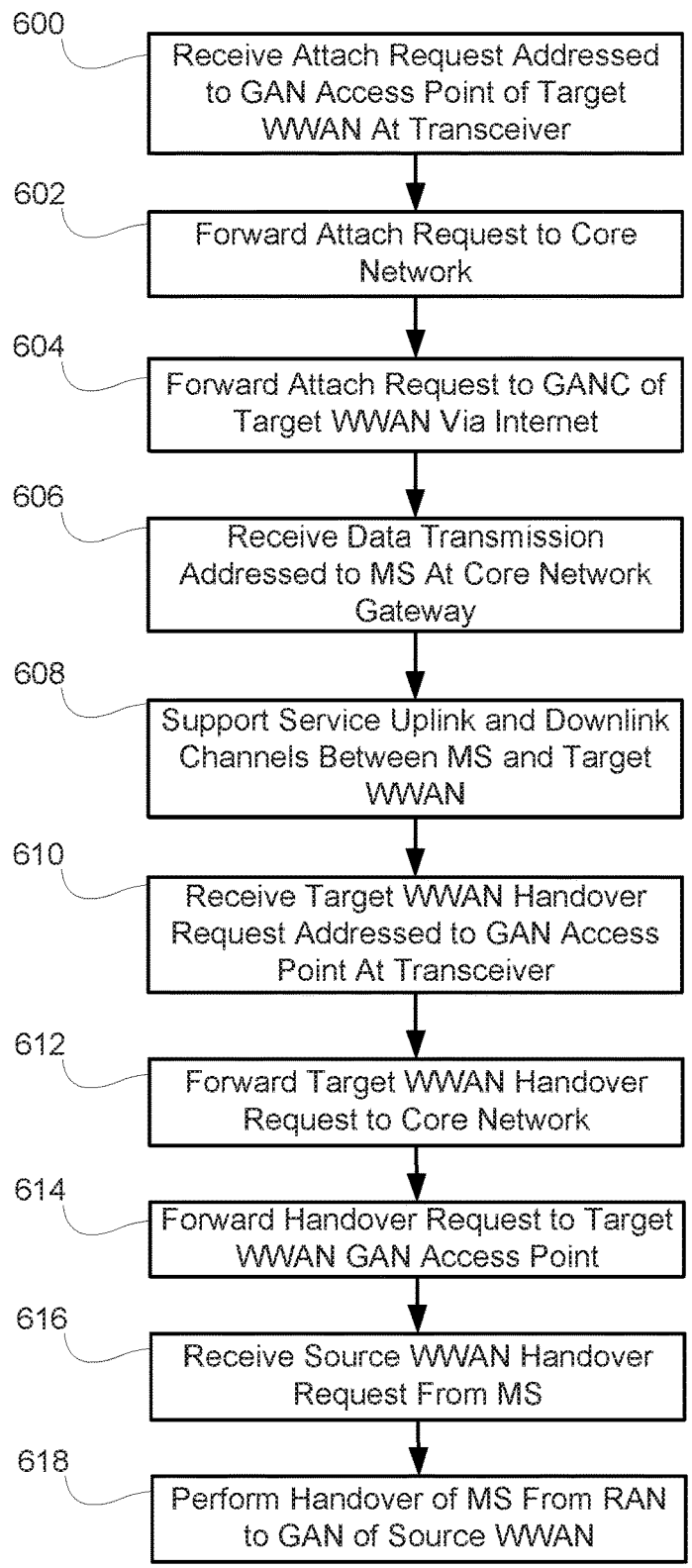
FIG. 6 is a flow diagram depicting a process by which a supporting wireless network facilitates an attachment procedure between an attached mobile station and a target wireless network.

FIG. 6 is a flow diagram depicting a process by which a mobile station attached to a first mobile wireless network can simultaneously become attached to a second mobile wireless network and thereafter execute handovers within both the first mobile wireless network and the second mobile wireless network. Alternative processes are contemplated that may include processing not explicitly identified in FIG. 6 and that also may not include all of the processing explicitly identified in FIG. 6. Similarly, alternative processes are contemplated that perform processing identified in FIG. 6 in a different order than indicated by FIG. 6.

At 600, the access network 110 of the WWAN 100 receives an attach request addressed to an access point of a GAN supported by the GANC 214 of the WWAN 200 from the MS 300 via the physical uplink channel 302 between the MS 300 and the transceiver 112A.

At 602, the first access network 110 forwards the attach request to the first core network 120. For example, if the WWAN 100 adheres to the LTE standard, the first access network 110 is an E-UTRAN that utilizes the EPC protocol stack to transmit the attach request through the EPC that is the first core network.

At 604, the first core network 120 forwards the attach request through the first core network gateway 122 to the GANC 214 via the Internet 400. At 606, the WWAN 100 receives a transmission addressed to the MS 300 from the GANC 214 through the first core network gateway 122 and supports a procedure to attach the MS 300 to the WWAN 200. Specifically, at 604 the WWAN 100 supports a resource control connection between the MS 300 and the second core network 220 by providing a tunnel between the core network gateway 122 and the transceiver 112A through which the second core network 220 can transmit data transmissions to and receive data transmissions from the MS 300 in order to provide various services, such as authentication, identification, verification, and protocol configuration, to the MS 300.

At 608, the WWAN 100 supports a service uplink channel and a service downlink channel between the MS 300 and the WWAN 200. Specifically, at 608, the WWAN 100 receives transmissions addressed to the MS 300 at the first core network gateway 122 and provides tunnels between the first core network gateway 122 and the transceiver 112A through which the WWAN 200 and the MS 300 exchange service transmissions.

At 610, the first access network 110 receives a handover initiation request addressed to the WWAN 200 from the MS 300 via the physical uplink channel 302 between the MS 300 and the transceiver 112A. At 612, the first access network 110 forwards the handover initiation request received at 610 to the first core network 120. At 614, the first core network 120 forwards the handover initiation request to the GANC 214.

At 616, the access network 110 receives a request to initiate a procedure for a handover of the MS 300 from a source access point of the WWAN 100 to a target access point of the WWAN 100. Specifically, the access network receives a request to reassign the MS 300 from the RAN that includes the transceiver 112A (the source access point) to an access point of a GAN supported by the GANC 114 (the target access point). At 618, the WWAN 100 establishes and configures bearers for providing services to the MS 300 through the GAN supported by the GANC 114. In alternative implementations, the WWAN 100 may not receive the request to initiate a procedure for a handover of the MS 300 at 616 but may instead receive an attach request from the MS 300 at the GANC 114 via the second core network gateway 222. Thereafter, the first core network 120 initiates a procedure to attach the MS 300 through the second core network gateway 222.

Figure 7:
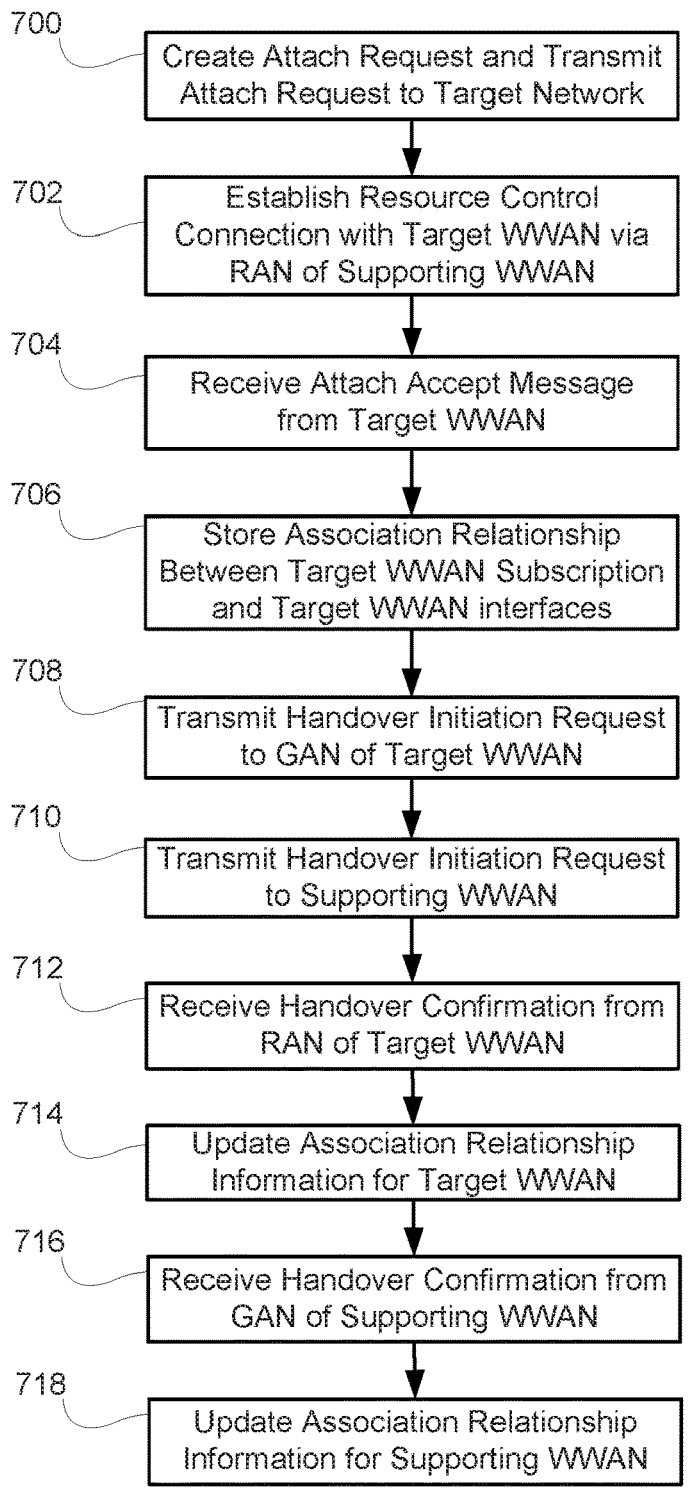
FIG. 7 is a flow diagram depicting a process by which a mobile station executes an attachment procedure with a target wireless network through a resource control connection that is tunneled through a supporting wireless network.

FIG. 7 is a flow diagram depicting a process by which a mobile station executes an attachment procedure with a target wireless network through a resource control connection that is tunneled through a supporting wireless network. Alternative processes are contemplated that may include processing not explicitly identified in FIG. 7 and that also may not include all of the processing explicitly identified in FIG. 7. Similarly, alternative processes are contemplated that perform processing identified in FIG. 7 in a different order than indicated by FIG. 7.

At 700, the MS 300, the first WWAN 100, and the second WWAN 200 are configured as depicted in FIG. 1, and the MS 300 transmits an attach request to the WWAN 200 by creating an attach request message addressed to the GANC 214 and transmitting the attach request message to the WWAN 100 via the physical uplink channel 302. The attach request message created by the MS 300 at 700 can include one or more of a mobile equipment identity (MEI) of the MS 300 and an international mobile subscriber identity (IMSI) of the MS 300. In addition, the attach request may also include a mobile subscriber integrated services digital network-number (MSISDN) previously assigned to the MS 300 by the WWAN 200, a globally unique temporary ID (GUTI) previously assigned to the MS 300 by the WWAN 200, or a packet temporary international mobile subscriber identity (P-TMSI) previously assigned to the MS 300 by the WWAN 200. The attach request can include an attach type identifier that indicates that the attach request corresponds to, e.g. an initial attach procedure, a handover, or an emergency attach procedure. If the WWAN 200 conforms to the LTE standard, the attach request provides radio resource control (RRC) parameters that include, e.g., a Selected Network that indicates a selected public land mobile network (PLMN) and a globally unique mobility management entity identifier (GUMMEI) corresponding to a prior connection between the MS 300 and the WWAN 200.

Additionally, the attach request can include a routing area identification (RAI) and various EPS security parameters. In some implementations, the EPS security parameters and other information received from the MS 300 by the WWAN 200 during the attachment procedure may not be included in the initial attach request message transmitted by the MS 300 to the WWAN 200. Instead, such additional information may be transmitted by the MS 300 in response to one or more replies to the attach request issued by the WWAN 200.

At 702 through 706, the configuration of the MS 300 and the WWANs 100 and 200 transitions to that depicted by FIG. 2. At 702, the MS 300 and the WWAN 200 establish a resource control connection that includes the physical uplink channel 302 and the physical downlink channel 304 and execute authentication and registration procedures across the resource control connection. At 702, the MS 300 may record one or more network interface parameters and corresponding to the resource control connection with the WWAN 200. For example, the MS 300 may record identifiers corresponding to one or more elements of the core network 220 and the first network gateway 122 and store such identifiers as well as an association relationship between such identifiers and one or more subscription identifiers of a subscription with the second WWAN 200 as a subscription information data store. The MS 300 can utilize the network interface parameters recorded at the subscription information data store in order to address responses to requests received from the WWAN 200 during the procedures executed at 702. For example, the MS 300 may transmit parameters utilized by the WWAN 200 in network configuration procedures to the WWAN 200 via the resource control connection.

At 704, the MS 300 receives an attach accept message from the WWAN 200 via the first core network gateway 122. The attach accept message received by the MS 300 can include a variety of information corresponding to the bearers created by the WWAN 200 for providing bearer services to the MS 300. For example, if the WWAN 200 conforms to the LTE standard, the attach accept message may include data pertaining to one or more resources of the WWAN 200 that have been allocated by the WWAN 200 for providing services to the MS 300. The attach accept message received by the MS 300 at 704 can include one or more access point names (APNs) that correspond to various elements of the WWAN 200 that are used in the provision of bearer services to the MS 300. For example, the attach accept message received by the MS 300 at 704 can include an address of the GUTI 214 and addresses of one or more components of the second core network 220.

At 706, the MS 300 stores association relationships between various identifiers corresponding to a subscription with the WWAN 200 and various network interfaces corresponding to service uplink and service downlink channels identified for the provision of services to the MS 300 by the WWAN 200. For example, the MS 300 can store one or more identifiers of a subscription with the WWAN 200, e.g. an IMSI, an IMEI, and an MSISDN, one or more identifiers of a network gateways and interfaces utilized for communications supported by the WWAN 200. At 706, the MS 300 may store an association relationship between subscription identifiers that include an IMSI, an IMEI, and an MSISDN and network interface parameters that include identifiers for physical uplink channel 302, physical downlink channel 304, first network gateway 122, and GANC 214.

Upon completion of 706 but prior to the performance of 708, the MS 300 may periodically verify integrity checks requested by the WWAN 200. The verification of integrity checks requested by the WWAN 200 includes transmission of integrity verifications to the core network 220 of the WWAN 200 in response to integrity check requests received from the WWAN 200. In some implementations, the integrity verifications can be pushed to the WWAN 200 by the MS 300, i.e. the integrity verifications may not be responsive to a request from the WWAN 200. For example, the MS 300 can be configured to automatically send integrity verification transmissions to the WWAN 200. In the configuration of the WWANs 100 and 200 and the MS 300 contemplated upon completion of 706, the MS 300 transmits the integrity verifications to the core network 220 via the physical uplink channel 302. Verifying connection integrity by replying to integrity check requests transmitted by the WWAN 200 to the MS 300 via the physical downlink channel 304 allows the MS 300 to ensure that the WWAN 200 continues to dedicate resources to the provision of services to the MS 300. This ensures that the MS 300 can rapidly execute a handover to a radio access network of the WWAN 200 from a state in which the MS 300 is currently connected to a radio access network of the WWAN 100. In other words, responding to integrity checks issued by the WWAN 200 allows the transition from the configuration from that depicted in FIG. 2 to that depicted in either of FIG. 3 or 4 to be executed very rapidly.

At 708, the MS 300 transmits a handover initiation request to the GANC 214 through the first core network gateway 122. The handover initiation request transmitted by the MS 300 at 708 passes through the first core network gateway 122 as well as an access point of a generic access network (GAN) that is a component of the WWAN 200 and that is supported by the GANC 214. The handover initiation request provides for a handover of the MS 300 from the GAN supported by the GANC 214 to a radio access network (RAN) that includes the transceiver 212A. The RAN that includes the transceiver is a component of the WWAN 200. The handover initiation request transmitted by the MS 300 at 708 includes a variety of information. The information included in the handover initiation request received at 708 includes a variety of information pertaining to the current location of the MS 300 and signal strengths of one or more RANs of the WWAN 200 (including a signal strength of the RAN that includes the transceiver 212A) as measured by the MS 300. Furthermore, one or more identifiers/parameters that were included in the attach request transmitted by the MS 300 at 700 can also be included in the handover initiation request.

At 710, the MS 300 transmits a handover initiation request to the WWAN 100 via the physical uplink channel 302 in which the MS requests to be handed over from the radio access network supporting the physical uplink channel 302 and the physical downlink channel 304 to a GAN supported by the GANC 114. The handover initiation request transmitted by the MS 300 at 710 causes the WWAN 100 to execute a handover preparation procedure in which data pertaining to a subscription between the MS 300 and WWAN 100 is transmitted from network components that support the RAN connection with the MS 300 to the network components that will be utilized to support the GAN connection with the MS 300.

At 712, the MS 300 receives a handover confirming transmission from the RAN of the WWAN 200 via the physical downlink channel 310. The handover confirming transmission received at 712 can indicate various network interfaces used to provide services to the MS 300 via the RAN of the WWAN 200 subsequent to the handover. At 714, the MS 300 updates a subscription information data structure storing identifiers for a subscription with the WWAN 200 and network interfaces of the WWAN 200. For example, the MS 300 can store an association relationship between subscription identifiers that include an IMSI, an IMEI, and an MSISDN and network interface parameters that include identifiers for physical uplink channel 308 and physical downlink channel 310.

At 716, the MS 300 receives a handover confirming transmission from the GAN supported by the GANC 114 via the second core network gateway 222. The handover confirming transmission received at 716 can indicate various network interfaces used to provide services to the MS 300 via the GAN of the WWAN 100 subsequent to the handover. At 718, the MS 300 stores association relationships between various identifiers corresponding to a subscription with the WWAN 100 and various network interfaces corresponding to service uplink and service downlink channels identified for the provision of services to the MS 300 by the WWAN 100. For example, the MS 300 can store an association relationship between subscription identifiers that include an IMSI, an IMEI, and an MSISDN assigned by WWAN 100 and network interface parameters that include identifiers for the GANC 114, the second network gateway 222, the physical uplink channel 308, and the physical downlink channel 310.

In various implementations, the execution of the procedures referenced at 710 through 718 may not occur in the sequence in which they are presented herein. Instead, the sequence by which the procedures identified in 710 through 718 may be dictated by the ability of the MS 300 to remain attached to the WWAN 100 during the execution of the handover from the GAN supported by the GANC 214 to the RAN of the WWAN 200 that supports the physical uplink channel 308 and the physical downlink channel 310. In some implementations, the MS 300 may become detached from the WWAN 100 during the execution of the handover within the WWAN 200 and a subsequent reattachment procedure to the first WWAN 100 via the GANC 114 may be required.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method, executed by a mobile station (MS) attached to a first wireless wide area network (WWAN), for attaching to a second WWAN while maintaining the attachment to the first WWAN, the method comprising:
   prior to a handover request by the MS, transmitting, via a physical uplink channel with a radio access network (RAN) of the first WWAN, an attach request message addressed to a generic access network controller of a generic access network (GAN) of the second WWAN via a third separate network;
   receiving, via a physical downlink channel with the RAN of the first WWAN, an attach accept message from the generic access network controller of the GAN of the second WWAN via the third separate network, the attach accept message including a packet data network (PDN) address; and
   storing, at a computer readable storage medium, an association relationship between an identifier of a subscription with the second WWAN and the PDN address.

2. The method of claim 1, wherein the identifier of the subscription with the second WWAN is a mobile subscriber integrated services digital network-number (MSISDN).

3. The method of claim 1, further comprising:
   transmitting, via the physical uplink channel with the RAN of the first WWAN, a handover request message addressed to the second WWAN.

4. The method of claim 3, further comprising:
   receiving, via a physical downlink channel with an RAN of the second WWAN, a transmission confirming a handover of the MS to the RAN of the second WWAN.

5. The method of claim 4, further comprising:
   transmitting, via the physical uplink channel with the RAN of the second WWAN, an attach request message addressed to a generic access network controller of a GAN of the first WWAN via the third separate network; and receiving, via the physical downlink channel with the RAN of the second WWAN, an attach accept message from the generic access network controller of the GAN of the first WWAN via the third separate network.

6. The method of claim 1, further comprising:
receiving, via the physical downlink channel with the RAN of the first WWAN, a connection integrity check request from the second WWAN; and
transmitting, via the physical uplink channel with the RAN of the first WWAN, a connection integrity verification addressed to the second WWAN.

7. A method, executed by a mobile station (MS) attached to a first wireless wide area network (WWAN), for attaching to a second WWAN while maintaining the attachment to the first WWAN, the method comprising:
prior to a handover request by the MS, transmitting, via a physical uplink channel with a radio access network (RAN) of the first WWAN, an attach request message addressed to a generic access network controller of a generic access network (GAN) of the second WWAN via a third separate network;
receiving, via a physical downlink channel with the RAN of the first WWAN, an attach accept message from the generic access network controller of the GAN of the second WWAN via the third separate network; and
after receiving the attach accept message, transmitting, via the physical uplink channel with the RAN of the first WWAN, a handover request message addressed to the generic access network controller of the GAN of the second WWAN via the third separate network.

8. The method of claim 7, further comprising:
receiving, via a physical downlink channel with a RAN of the second WWAN, a transmission confirming a handover of the MS to the RAN of the second WWAN.

9. The method of claim 7, further comprising:
receiving, via the physical downlink channel with the RAN of the first WWAN, a connection integrity check request from the second WWAN; and
transmitting, via the physical uplink channel with the RAN of the first WWAN, a connection integrity verification addressed to the second WWAN.

10. The method of claim 7, further comprising:
transmitting, via the physical uplink channel with the RAN of the second WWAN, an attach request message addressed to a generic access network controller of a GAN of the first WWAN via the third separate network; and
receiving, via the physical downlink channel with the RAN of the second WWAN, an attach accept message from the generic access network controller of the GAN of the first WWAN via the third separate network.

11. The method of claim 7, wherein the attach accept message includes a packet data network (PDN) address, and the method further comprising:
storing, at a computer readable storage medium, an association relationship between an identifier of a subscription with the second WWAN and the PDN address.

12. A mobile station configured to connect to a generic access network (GAN) of a second wireless wide area network (WWAN) via a radio access network (RAN) of a first WWAN, the mobile station comprising:
a processor configured to construct an attach request message addressed to a generic access network controller of the GAN of the second WWAN;
a radio frequency (RF) transceiver configured to:
prior to a handover request by the mobile station, transmit, via a physical uplink channel with the RAN of the first WWAN, the attach request message addressed to the generic access network controller of the GAN of the second WWAN via a third separate network; and
receive, via a physical downlink channel with the RAN of the first network, an attach accept message from the generic access network controller of the GAN of the second WWAN via the third separate network;
wherein the processor is further configured to construct a handover request message addressed to the generic access network controller of the GAN of the second WWAN after receiving the attach accept message, and wherein the RF transceiver is further configured to transmit, via the physical uplink channel with the RAN of the first network, the handover request message addressed to the second WWAN via the third separate network.

13. The mobile station of claim 12, wherein the attach accept message includes a packet data network (PDN) address, and the mobile station further comprising:
a processor readable storage medium configured to store an association relationship between an identifier of a subscription with the second WWAN and the PDN address.

* * * * *